United States Patent
Shiba (10) Patent No.: US 11,874,408 B2
(45) Date of Patent: Jan. 16, 2024

(54) SONAR APPARATUS, TARGET VELOCITY DISPLAY METHOD, AND NON-TRANSITORY MEDIUM

(71) Applicant: NEC Corporation, Tokyo (JP)

(72) Inventor: Hisashi Shiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 165 days.

(21) Appl. No.: 17/222,042

(22) Filed: Apr. 5, 2021

(65) Prior Publication Data

US 2021/0318421 A1 Oct. 14, 2021

(30) Foreign Application Priority Data

Apr. 6, 2020 (JP) ................. 2020-068498

(51) Int. Cl.
*G01S 7/62* (2006.01)
*G01S 15/58* (2006.01)

(52) U.S. Cl.
CPC .......... *G01S 7/6209* (2013.01); *G01S 15/582* (2013.01); *G01S 15/588* (2013.01)

(58) Field of Classification Search
CPC .... G01S 7/6209; G01S 15/582; G01S 15/588; G01S 7/62; G01S 15/104; G01S 15/42; G01S 15/108
USPC ....................................................... 367/107
See application file for complete search history.

(56) References Cited

U.S. PATENT DOCUMENTS

| 4,244,026 | A | 1/1981 | Dickey, Jr. |
| 5,515,055 | A | 5/1996 | Hollinger |
| 2019/0025419 | A1 | 1/2019 | Shiba |
| 2020/0182994 | A1 | 6/2020 | Kageme et al. |

FOREIGN PATENT DOCUMENTS

| JP | H01-020395 B2 | 4/1989 |
| JP | H02-284083 A | 11/1990 |
| JP | H10-319059 A | 12/1998 |
| JP | 2010-032319 A | 2/2010 |
| JP | 2010-230643 A | 10/2010 |
| JP | 2011-203185 A | 10/2011 |
| JP | 2019-023577 A | 2/2019 |
| WO | 2019/043749 A1 | 3/2019 |

OTHER PUBLICATIONS

JP Office Action for JP Application No. 2020-068498, dated Oct. 3, 2023 with English Translation.

*Primary Examiner* — Daniel L Murphy (57) ABSTRACT

A processor of a sonar system extracts a signal in a predetermined time range from a signal received by an acoustic array, calculates a correlation value for a signal waveform extracted, detects a peak value of the correlation value, calculates an integrated value by performing time-integration of a square of the correlation value, obtains a target velocity based on the peak value and the integrated value, and displays the target velocity on a display apparatus.

20 Claims, 8 Drawing Sheets

SONAR APPARATUS, TARGET VELOCITY DISPLAY METHOD, AND NON-TRANSITORY MEDIUM

CROSS REFERENCE TO RELATED APPLICATIONS

This application is based upon and claims the benefit of the priority of Japanese patent application No. 2020-068498, filed on Apr. 6, 2020, the disclosure of which is incorporated herein in its entirety by reference thereto.

FIELD

The present invention relates to a sonar apparatus, a target velocity display method, and a non-transitory medium.

BACKGROUND

Figure 6:
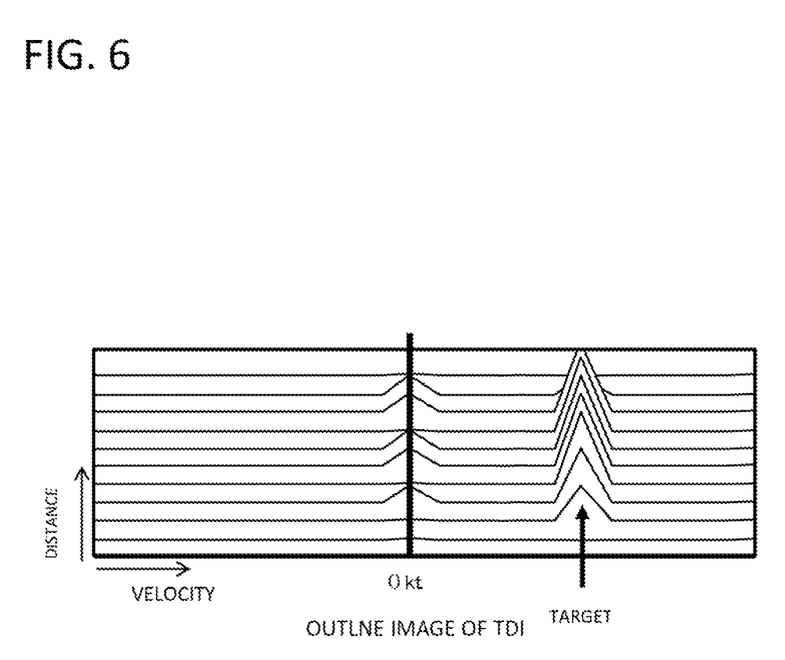
FIG. 6 is a diagram illustrating TDI.

In an active sonar, a velocity in a line-of-sight direction of a target is displayed based on Doppler shift of a reverberation sound produced by target motion against, for example, a constant frequency PCW (Pulse Continuous Wave). This display screen takes such a display format as illustrated in FIG. 6, and is called TDI (Target Doppler Indicator), wherein a vertical axis is a distance, and a horizontal axis is a velocity, that is, a display format for a distance change based on Doppler frequency shift (a target velocity component in a target azimuth direction).

Figure 7:
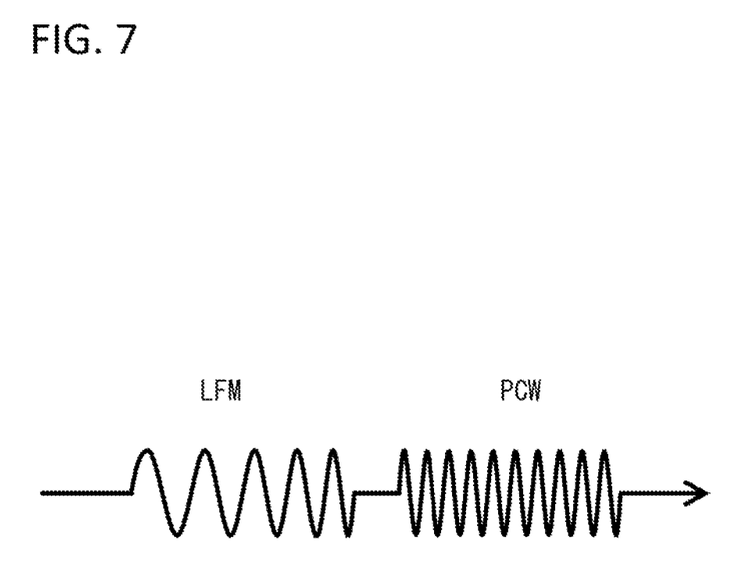
FIG. 7 is a diagram illustrating a tandem transmission waveform I.

There is known a tandem transmission in which consecutively before and after a PCW, frequency-modulated waveforms such as LFM (Linear Frequency Modulation) and HFM (Hyperbolic Frequency Modulation) are transmitted as illustrated in FIG. 7. In this tandem transmission, with regards to the frequency modulated waveform, a correlation processing (replica correlation) between a transmission waveform and a received signal is performed. Therefore, even under a low SNR (Signal to Noise Ratio) environment, the SNR can be improved to enhance visibility.

In the tandem transmission, however, correlation processing for a PCW is not performed. In the TDI where a target velocity is displayed using the PCW, visibility will be decreased in a low SNR circumstance. Even if a replica correlation is to be performed for a PCW, since a correlation value will become low between a Doppler shifted reverberation sound and a transmission waveform, improvement in visibility cannot be obtained.

Therefore, as disclosed in Patent Literature (PLT) 1, for example, a method is widely used in which a plurality of waveforms getting transformed by Doppler effect for a plurality of velocities are prepared in advance by assuming possible velocities of a target, correlation processing between each of the waveforms and a received signal is performed, and an assumed velocity of a waveform with the highest correlation value is regarded as a target velocity. It is noted that the correlation of the PCW has no steep peak. Therefore, a noise peak position may be likely to be mistaken for a correlation peak position under an environment of low spatial resolution and a low SNR. Accordingly, in most cases, a method is adopted in which, with respect to a modulated waveform such as LFM or the like, waveforms of a plurality of velocities (a plurality of replicas) are prepared to perform correlation.

However, in the method in which a plurality of replicas are to be prepared in advance, if a velocity resolution of a target is to be improved, so many replicas are necessary. Therefore, a correlation processing amount is increased by the number of the replicas and a calculation load will significantly increase. For example, if it is assumed that a relative velocity to a target is up to ±100 kt (Knot) and a velocity resolution is 1 kt, 201 replicas are required, which results in a calculation load being 201 times as compared with that of a normal processing in which one replica is used.

On the other hand, as disclosed in PLT 1, there is also a system in which HFM, which has a small degradation in the correlation even in a presence of a Doppler effect, is consecutively transmitted multiple times, time differences between reverberations corresponding to respective pulses are measured, and a target velocity is estimated based on expansion and contraction of the time difference.

Figure 8:
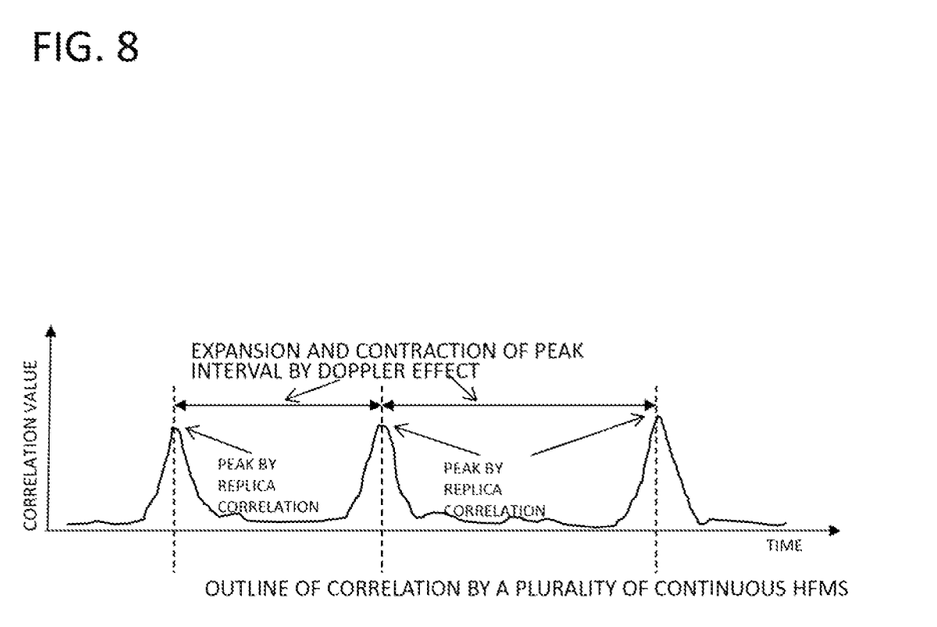
FIG. 8 is a diagram illustrating correlation by a plurality of continuous HFMs.

As illustrated in FIG. 8, an effect of expansion and contraction of a pulse length due to a Doppler effect is used. FIG. 8 is a schematic diagram illustrating an image of correlation by a plurality of continuous HFMs, in which a horizontal axis is time and a vertical axis is a correlation value. A peak interval (time interval) by replica correlation is expanded and contracted due to a Doppler effect.

In this method (a method for estimating a target velocity based on expansion and contraction of time differences), it is possible to reduce the number of correlation processing (replica correlation processing), thus not increasing a calculation load. However, this method is affected by a distance accuracy of a target. For example, there is no sonar system inclusive of a high performance sonar system, that can realize a distance error less than or equal to 0.1%. Let the distance error be 0.1%, a target distance for a target located 10 kyd ahead would contain an error of 10 yd (yard).

Assuming that a velocity resolution of 1 kt is required, when a pulse interval is 10 s (seconds), influence due to a Doppler effect for 1 kt is around 2×1 kt/acoustic velocity=$1/1500$. Therefore, it is necessary to be able to discriminate a deviation of time of $1/150$ second and of a distance of 10 m (around 11 yd).

However, a magnitude of this deviation (10 m (around 11 yd)) is equivalent to the distance error (10 yd) as described above.

In order to discriminate a deviation of a distance without being affected by a distance error, it may suffice that a pulse length has, for example, a time period of ten times of 10 s, that is, 100 s. However, in a case where there is a time difference of 100 s, when especially, both a sonar system side and a target side are in moving, for example, they are navigating around 10 kt, they will move 500 m or more during 100 s. As a result, because a transmission path of an acoustic wave changes and an arrival time of echoes changes due to expansion and contraction of the path, there may be a case where a target distance to be estimated changes. That is, because time intervals between a plurality of echoes caused by a plurality of pulses depend on change of a length of a transmission path, there is a case where a velocity may not be obtained correctly.

Furthermore, this method (a method for estimating a target velocity based on expansion and contraction of a time difference) is limited to HFM as a waveform. Therefore, a waveform having high distance resolution such as FH (Frequency Hopping) cannot be used. It is noted that the higher the frequency (the shorter the wavelength), the higher the distance resolution.

CITATION LIST

Patent Literature

PTL 1: U.S. Pat. No. 5,515,055B

Non-Patent Literature

NPL 1: Marine Acoustics Society of Japan, "Fundamentals and Applications of Marine Acoustics", p 139 to 141, SEIZANDO-SHOTEN PUBLISHING, published on Apr. 28, 2004

SUMMARY

In a sonar system, SNR (Signal to Noise Ratio) of a far target becomes low. However, it is preferable to display a target with high visibility in order to get a velocity with high accuracy even when the target is located far.

Furthermore, downsized ships come into service, and it is expected to utilize more downsized unmanned vehicles in the future. Therefore, it is required to considerably reduce the number of computers for sonar processing as compared to a current situation.

Accordingly, it is an object of the present invention to provide a sonar apparatus, a method, and a non-transitory medium storing a program, each enabling to display a target velocity with high visibility even in, for example, a low SNR (Signal to Noise Ratio) environment.

According to an aspect of the present invention, there is provided a sonar apparatus including a processor connected to an acoustic array and a display apparatus, wherein the processor extracts a signal in a predetermined time range from a signal received by the acoustic array,
  calculates a correlation value of a signal waveform extracted,
  detects a peak value of the correlation value,
  calculates an integrated value by performing time-integration of a square of the correlation value,
  derives a target velocity, based on the peak value and the integrated value, and
  displays the target velocity on a display apparatus.

According to other one aspect, there is provided a target velocity display method including
  extracting a signal in a predetermined time range from a signal received by an acoustic array;
  calculating a correlation value of a signal waveform extracted;
  detecting a peak value of the correlation value;
  calculating an integrated value by performing time-integration of a square of the correlation value; and
  deriving a target velocity based on the peak value and the integrated value, to display the target velocity on a display apparatus.

According to other one aspect, there is provided a program that causes a processor to execute processing, comprising:
  extracting a signal in a predetermined time range from a signal received by an acoustic array;
  calculating a correlation value for a waveform of the extracted signal;
  detecting a peak value of the correlation value;
  calculating an integrated value by performing time-integration of a square of the correlation value; and
  deriving a target velocity based on the peak value and the integrated value to display the target velocity on a display apparatus.

Furthermore, according to the present invention, there is provided a non-transitory computer-readable storage medium on which the above program is recorded (for example, semiconductor storage, such as RAM (Random Access Memory), ROM (Read Only Memory), or EEPROM (Electrically Erasable and programmable ROM) and so on, HDD (Hard Disk Drive), SSD (Solid State Drive), CD (Compact Disk), and DVD (Digital Versatile Disk)).

According to the present invention, it is possible to display a target velocity with high visibility even in, for example, a low SNR (Signal to Noise Ratio) environment.

DETAILED DESCRIPTION

Figure 1:
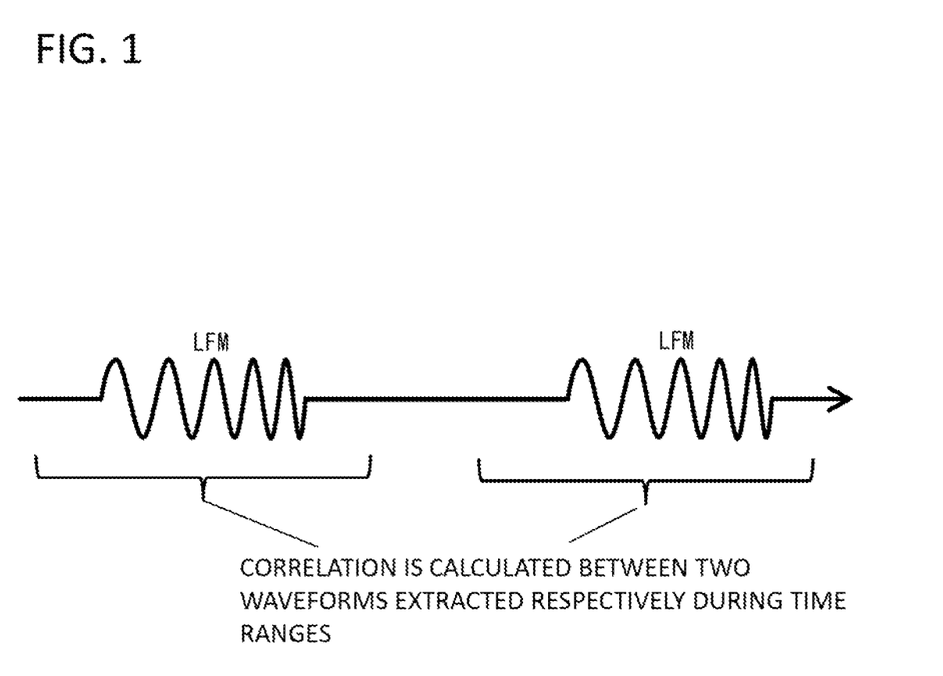
FIG. 1 is a diagram illustrating an example embodiment according to the present invention.

An example embodiment of the present invention will be described. FIG. 1 illustrates an example embodiment according to the present invention, and schematically illustrates target echoes when an LFM signal is transmitted twice. Referring to FIG. 1, a sonar system (sonar apparatus) is configured to transmit, multiple times at intervals, a signal waveform, such as an LFM signal or the like, which can provide high distance resolution by taking correlation thereof and performs correlation processing among a plurality of target echoes received. When transmitting an LFM signal twice, as illustrated in FIG. 1, the active sonar apparatus extracts two signal waveforms, each in a predetermined time range (time window) from the received signal, and calculates a cross-correlation between the extracted signal waveforms. Furthermore, the sonar apparatus performs time-integration of the correlation processing result (a square of an absolute value of the cross-correlation value) and estimates a target velocity, based on a relationship between the integration result and a peak of the cross-correlation value. As illustrated in FIG. 1, the time window (predetermined time range) used to sequentially extract a received signal is preferably longer than an LFM waveform (a pulse length). Furthermore, the time interval between a plurality of signals to be extracted corresponds to a time interval of the transmission waveform (LFM).

According to the example embodiment of the present invention, a computational load is not increased even in a low SNR environment and is not affected by change of a transmission path in time, and hence it is possible to provide a display which increases target distance accuracy and enhances target visibility.

Figure 2:
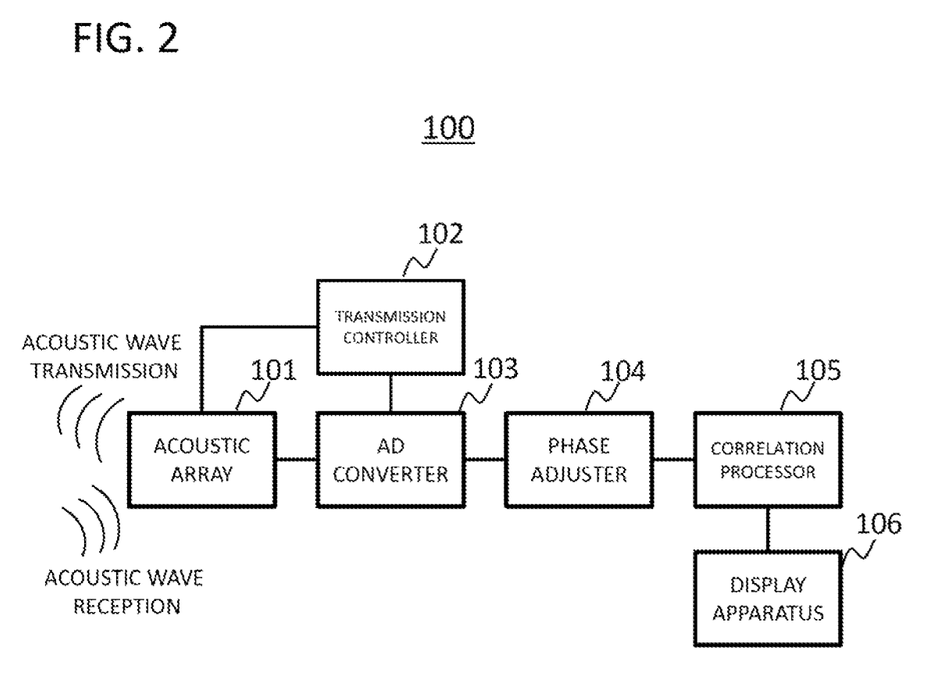
FIG. 2 is a diagram illustrating an example of a configuration of an apparatus of an example embodiment according to the present invention.

FIG. 2 illustrates an example of a configuration of a sonar system (sonar apparatus) 100 (target velocity display system) of an example embodiment according to the present invention. In the sonar system 100, an acoustic array 101 includes a plurality of acoustic elements which transmit an acoustic wave into a water by converting an electrical signal outputted from a transmission controller (transmission control part) 102 to an acoustic signal and converts a received acoustic signal to an electrical signal. The transmission controller 102 generates an electrical signal with a waveform specified. An AD converter (analog-to-digital converter) 103 converts an analog electrical signal supplied from each acoustic element to a digital signal. A phase adjuster (phaser) (phase adjusting part) 104 performs phase adjustment (phasing) for each azimuth direction on digital signals, each received from each acoustic element to perform beamforming and outputs a beam for each azimuth direction. A correlation processor (correlation processing part) 105 performs a correlation processing for each beam and calculates a target velocity.

A display apparatus 106 displays a target velocity on a screen (not illustrated). The acoustic array 101, the AD converter 103, the phase adjuster 104, and the display apparatus 106 themselves are apparatuses generally available, and those employed in various existing sonar systems may be used.

The following describes the transmission controller 102 and the correlation processor 105, focusing operation thereof. The transmission controller 102 generates an electrical signal that enables a pulse having a predetermined waveform to be transmitted multiple times. On this occasion, the transmission controller 102 shares information on an interval between pulses in addition to each pulse waveform with the correlation processor 105. Transmission times of transmission waveforms, for example, twice or more may be sufficient, and the number of times is not particularly limited.

Figure 3:
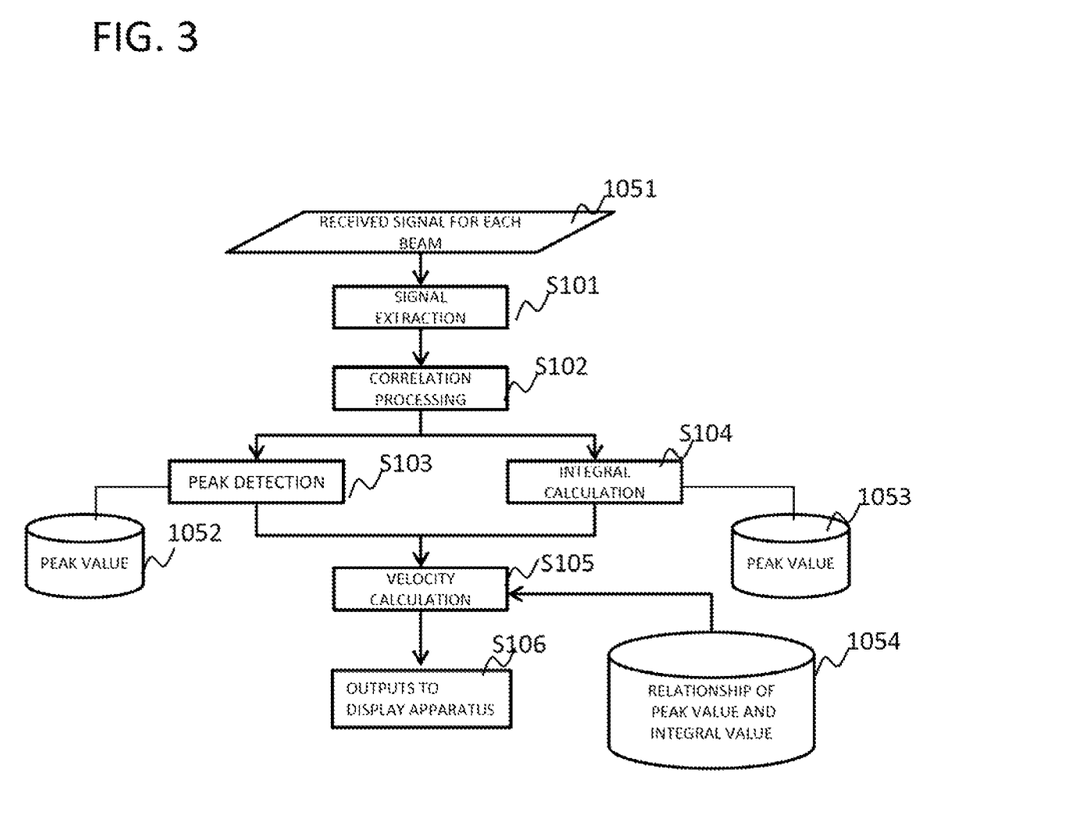
FIG. 3 is a diagram illustrating a processing procedure of an apparatus of an example embodiment according to the present invention.

The correlation processor 105 operates according to a flow as shown in FIG. 3.

The correlation processor 105 extracts a signal in a predetermined time range from a received signal 1051 for each beam outputted from the phase adjuster 104 and stores the signal in a storage part (not shown) (S101). This time range preferably exceeds one pulse length.

Next, the correlation processor 105 selects, from a plurality of extracted signal waveforms, a combination of two extracted signal waveforms, with time interval therebetween corresponding to a time interval of the transmitted pulse and calculates a cross-correlation value between the two extracted signal waveforms (S102).

Next, the correlation processor 105 detects a peak of the cross-correlation value (S103) and stores the peak value in the storage part 1052.

The correlation processor 105 integrates a cross-correlation result (time integration result of a square of the cross-correlation) and stores an integrated value in the storage part 1053.

Then, the correlation processor 105 calculates a target velocity by supplying, as inputs, the peak value and the integrated value respectively obtained in steps S103 and S104 to a function which represents relationship between a peak value and an integrated value stored in the storage part 1054 in advance (S105). Since the relationship between a peak value and an integrated value depends on Doppler effect, it is possible to derive a target velocity based on the relationship between a peak value and an integrated value.

The correlation processor 105 supplies the target velocity to the display apparatus 106 (S106).

An example where a transmission waveform is LFM will be described below.

Let an acoustic velocity be c, let a velocity component of the sonar in a direction from the sonar to the target be $v_s$ under a condition where a direction from the sonar to a target is positive and let a velocity component of the target in a direction from the sonar to the target be $v_o$ (that is, $v_s$ is positive when the sonar has a velocity directed to the target and $v_o$ is positive when the target has a velocity component moving away from the sonar). Let a relative velocity between the sonar system 100 and the target (not shown) be $v=v_s-v_o$, a Doppler coefficient η (and its square) is given (approximated) by an expression (1a) (an expression (1b)).

$$\eta \cong 1 + \frac{2(v_s - v_o)}{c} = 1 + \frac{2v}{c} \tag{1a}$$

$$\eta^2 \cong 1 + \frac{4v}{c} \tag{1b}$$

That is, let a frequency of a sound source be $f_0$, a frequency $f_1$ of an acoustic wave from the sound source to a target is given as $f_1=f_0 c/(c-v)$ and a frequency $f_2$ of a reflected wave from the target is given as $f_2=f_1(c+v)/c$. Hence, we have the following expression.

$$\eta = \frac{f_2}{f_0} = \frac{(c+v)}{(c-v)} = \frac{\left(1+\frac{v}{c}\right)}{\left(1-\frac{v}{c}\right)} \cong \left(1+\frac{v}{c}\right)^2 \cong 1 + 2\frac{v}{c} \quad (\because v \ll c) \tag{2}$$

In a case where the pulse has a single frequency, the frequency $f_2$ from the target becomes $\eta f_0$ by Doppler effect.

Here, a transmission waveform (complex representation) (replica) is assumed to be LFM as represented in the following expression (3).

$$s(t) = \begin{cases} B\exp\left(j\omega t + \frac{j\mu t^2}{2}\right) & |t| \le \frac{T_0}{2} \\ 0 & \text{other than avobe} \end{cases} \tag{3}$$

In the expression (3), B is an amplitude, ω ($=2\pi f_0$: $f_0$ is a start frequency) is an angular frequency, t is time, and μ is a frequency change rate (chirp rate), where $j^2=-1$, and $T_0$ is a pulse length.

An instantaneous frequency f(t) of the transmission waveform is given by time-differentiating a phase component of the transmission waveform of the expression (3) $\phi=\omega t+\mu t^2/2$, as below.

$$f(t) = \left(\frac{1}{2\pi}\right)\frac{d}{dt}\left\{\omega t + \left(\frac{1}{2}\right)\mu t^2\right\} = f_0 + \left(\frac{1}{2\pi}\right)\mu t \tag{4}$$

The received waveform subjected to Doppler effect is given by the following expression (5).

$$S(t) = \begin{cases} A\sqrt{\eta}\exp\left\{j\omega \cdot \eta(t-t_0) + \frac{j\mu \cdot \eta^2(t-t_0)^2}{2}\right\} & |\eta(t-t_0)| \le \frac{T_0}{2} \\ 0 & \text{other than above} \end{cases} \tag{5}$$

It is assumed that, by Doppler effect, the instantaneous frequency of the received waveform (LFM) is given by ρf(t) for an instantaneous frequency f(t) (the expression (4)) of a transmission waveform as with a single pulse. It can also be regarded that a time is set from t to ηt. That is, a phase component φ of the received waveform may be obtained by time-integrating the instantaneous frequency f(t) of the above expression (4) for a range from 0 to ηt.

$$\phi = 2\pi \int_o^{\eta t} \left\{ f_0 + \left(\frac{1}{2\pi}\right)\mu t' \right\} dt' = 2\pi \left\{ f_0 \eta t + \left(\frac{1}{2\pi}\right) \mu \frac{(\eta t)^2}{2} \right\} = \omega \eta t + \mu \frac{(\eta t)^2}{2} \quad (6)$$

When $t_0=0$ in the expression (5) only for the sake of calculation simplification of, the received waveform S(t) is represented as below.

$$S(t) = \begin{cases} A\sqrt{\eta} \exp\left\{ j\omega \cdot \eta t + \frac{j\mu \cdot \eta^2 t^2}{2} \right\} & |\eta t| \leq \frac{T_0}{2} \\ 0 & \text{other than above} \end{cases} \quad (7)$$

For example, a correlation (cross-correlation) between two received waveforms (target echoes) which are waveforms returned by reflection from a target when the same waveform is transmitted twice can be regarded as an auto-correlation of the received waveform.

For $\tau = 0$, (8)

$$R_{SS}(0) = \int_{-\infty}^{\infty} S^*(t)S(t)dt =$$

$$|A|^2 \eta \int_{-T_0/2\eta}^{T_0/2\eta} \exp(-j\omega\eta t - j\mu\eta^2 t^2/2) \exp(j\omega\eta t + j\mu\eta^2 t^2/2) dt =$$

$$|A|^2 \eta \int_{-T_0/2\eta}^{T_0/2\eta} dt = |A|^2 T_0$$

(where * denotes complex conjugate operator)

Next, for $0 < \eta < T_0$, $$R_{SS}(\tau) = \int_{-\infty}^{\infty} S^*(t)S(t+\tau)dt = |A|^2 \eta \int_{-\frac{T_0}{2\eta}}^{\frac{T_0}{2\eta}-\tau} \exp\left\{-j\omega \cdot \eta t - \frac{j\mu \cdot \eta^2 t^2}{2}\right\} \quad (9)$$

$$\exp\left( j\omega\eta t + \frac{j\mu\eta^2 t^2}{2} + j\omega\eta\tau + \frac{j\mu\eta^2 \tau^2}{2} + j\mu\eta^2 \tau t \right) dt =$$

$$|A|^2 \eta \int_{-T_0/2\eta}^{T_0/2\eta - \tau} \exp\left( j\omega\eta\tau + \frac{j\mu\eta^2 \tau^2}{2} + j\mu\eta^2 \tau t \right) dt =$$

$$|A|^2 \eta \exp\left( j\omega\eta\tau + \frac{j\mu\eta^2 \tau^2}{2} \right) \int_{-T_0/2\eta}^{T_0/2\eta - \tau} \exp(j\mu\eta^2 \tau t) dt$$

A definite integral of a function $\exp(j\mu\eta^2 \tau t)$ of the above expression (9) with an integration section of $[-T_0/(2\eta), T_0/(2\eta)-\tau]$ is given by the following expression (10).

$$\int_{-T_0/2\eta}^{T_0/2\eta - \tau} \exp(j\mu\eta^2 \tau t) dt = \left[ \frac{1}{j\mu\eta^2 \tau} \exp(j\mu\eta^2 \tau t) \right]_{-T_0/2\eta}^{T_0/2\eta - \tau} = \quad (10)$$

$$\frac{1}{j\mu\eta^2\tau} \left\{ \exp\left( \frac{j\mu\eta\tau T_0}{2} - j\mu\eta^2\tau^2 \right) - \exp\left( -\frac{j\mu\eta\tau T_0}{2} \right) \right\} = \frac{\exp\left( -\frac{j\mu\eta^2\tau^2}{2} \right)}{j\mu\eta^2\tau}$$

$$\left\{ \exp\left( \frac{j\mu\eta\tau T_0}{2} - \frac{j\mu\eta^2\tau^2}{2} \right) - \exp\left( -\frac{j\mu\eta\tau T_0}{2} + \frac{j\mu\eta^2\tau^2}{2} \right) \right\} =$$

$$\frac{2\exp\left( -\frac{j\mu\eta^2\tau^2}{2} \right)}{\mu\eta^2\tau} \sin\left( \frac{\mu\eta\tau T_0}{2} - \frac{\mu\eta^2\tau^2}{2} \right) =$$

$$\frac{2\exp\left( -\frac{j\mu\eta^2\tau^2}{2} \right)}{\mu\eta^2\tau} \sin\left\{ \frac{\mu\eta\tau}{2}(T_0 - \eta\tau) \right\}$$

Accordingly, the expression (9) is given as follows.

(11)

$$R_{SS}(\tau) =$$

$$|A|^2 \eta \exp\left( j\omega\eta\tau + \frac{j\mu\eta^2\tau^2}{2} \right) \frac{2\exp\left(-\frac{j\mu\eta^2\tau^2}{2}\right)}{\mu\eta^2\tau} \sin\left\{ \frac{\mu\eta\tau}{2}(T_0 - \eta\tau) \right\} =$$

$$\frac{2|A|^2}{\mu\eta\tau} \exp(j\omega\eta\tau) \sin\left\{ \frac{\mu\eta\tau}{2}(T_0 - \eta\tau) \right\} =$$

$$\frac{|A|^2 (T_0 - \eta\tau) \exp(j\omega\eta\tau) \sin\left\{ \frac{\mu\eta\tau}{2}(T_0 - \eta\tau) \right\}}{\frac{\mu\eta\tau}{2}(T_0 - \eta\tau)} =$$

$$|A|^2 (T_0 - \eta\tau) \exp(j\omega\eta\tau) \operatorname{sinc}\left\{ \frac{\mu\eta\tau}{2}(T_0 - \eta\tau) \right\}$$

where sin c(x) is a denormalized sin c function (sin x)/x.

With such approximation as $|\eta\tau| \ll T_0$, the expression (11) is approximated as below.

$$R_{SS}(\tau) \approx |A|^2 T_0 \exp(j\omega\eta\tau) \operatorname{sinc}\left( \frac{\mu\eta T_0 \tau}{2} \right) \quad (12)$$

Form the above, the following is derived with respect to $R_{SS}(\tau)$.

(13)

$$R_{SS}(\tau) = \begin{cases} \frac{2|A|^2}{\mu\eta\tau} \exp(j\omega\eta\tau) \operatorname{sinc}\left\{ \frac{\mu\eta\tau}{2}(T_0 - \eta\tau) \right\} & 0 < \eta\tau \leq T_0 \\ |A|^2 T_0 & \eta\tau = 0 \\ \frac{2|A|^2}{\mu\eta\tau} \exp(j\omega\eta\tau) \operatorname{sinc}\left\{ \frac{\mu\eta\tau}{2}(T_0 + \eta\tau) \right\} & -T_0 \leq \eta\tau < 0 \\ 0 & \eta\tau < -T_0 \text{ or } \eta\tau > T_0 \end{cases}$$

The above expression (13), when approximated by $|\eta\tau| \ll T_0$, is given as below.

$$R_{SS}(\tau) \approx \begin{cases} \dfrac{2|A|^2}{\mu\eta\tau}\exp(j\omega\eta\tau)\sin\left(\dfrac{\mu\eta\tau T_0}{2}\right) = & 0 < \eta\tau \leq T_0 \\ |A|^2 T_0 \exp(j\omega\eta\tau) sinc\left(\dfrac{\mu\eta T_0\tau}{2}\right) & \\ |A|^2 T_0 & \eta\tau = 0 \\ \dfrac{2|A|^2}{\mu\eta\tau}\exp(j\omega\eta\tau)\sin\left(\dfrac{\mu\eta\tau T_0}{2}\right) = & -T_0 \leq \eta\tau < 0 \\ |A|^2 T_0 \exp(j\omega\eta\tau) sinc\left(\dfrac{\mu\eta T_0\tau}{2}\right) & \\ 0 & \eta\tau < -T_0 \text{ or } \eta\tau > T_0 \end{cases} \quad (14)$$

Since $R_{SS}(\tau)$ is intensively concentrated at $\tau=0$ and sharply drops to zero at $\tau\to\infty$, $R_{SS}(\tau)$ can be regarded to continue infinitely. That is, $R_{SS}(\tau)$ can be approximated by the following expression (15) for all $\tau$.

$$R_{SS}(\tau) \approx |A|^2 T_0 \exp(j\omega\eta\tau) sinc\left(\frac{\mu\eta T_0\tau}{2}\right) \quad (15)$$

The correlation value $R_{SS}(\tau)$ in the above expression (15) takes its peak value at $\tau=0$. Since $\exp(0)=1$ and $sinc(0)=1$, the peak value P is given by the following equation (16).

$$P = R_{SS}(0) = |A|^2 T_0 \quad (16)$$

The following describes an autocorrelation of $R_{SS}(\tau)$, wherein $R_{SS}(t)$ in the expression (15) is denoted by $R_\mu(\tau)$ as in the following equation (17) and let its autocorrelation be denoted by $R_{\mu\mu}(\tau)$ (autocorrelation of $R_{SS}(\tau)$).

$$R_\mu(t) = |A|^2 T_0 \exp(j\omega\eta t) sinc\left(\frac{\mu\eta T_0 t}{2}\right) \quad (17)$$

$$R_{\mu\mu}(\tau) = \int_{-\infty}^{\infty} R_\mu^*(t) R_\mu(t+\tau) dt = |A|^4 T_0^2 \int_{-\infty}^{\infty} \exp(-j\omega\eta t) \cdot sinc\left(\frac{\mu\eta T_0 t}{2}\right) \exp(j\omega\eta t + j\omega\eta\tau) sinc\left(\frac{\mu\eta T_0 t}{2} + \frac{\mu\eta T_0\tau}{2}\right) dt = $$

$$|A|^4 T_0^2 \exp(j\omega\eta\tau) \int_{-\infty}^{\infty} sinc\left(\frac{\mu\eta T_0 t}{2}\right) sinc\left(\frac{\mu\eta T_0 t}{2} + \frac{\mu\eta T_0\tau}{2}\right) dt = $$

$$|A|^4 T_0^2 \exp(j\omega\eta\tau) \int_{-\infty}^{\infty} sinc\left(\frac{\mu\eta T_0 t}{2}\right) sinc\left\{\frac{\mu\eta T_0}{2}(t+\tau)\right\} dt \quad (18)$$

An outline of derivation of an integral term in the above expression (18) will be described below. A well-known mathematical formula $$\int_{-\infty}^{\infty} \frac{\sin\{\alpha(x-a)\}}{x-a} \frac{\sin\{\beta(x-b)\}}{x-b} dx = \frac{\pi \cdot \sin\{\alpha(a-b)\}}{a-b} \quad (19)$$

is transformed as below.

$$\int_{-\infty}^{\infty} \frac{\alpha \cdot \sin\{\alpha(x-a)\}}{\alpha(x-a)} \frac{\beta \cdot \sin\{\beta(x-b)\}}{\beta(x-b)} dx = \frac{\pi\alpha \cdot \sin\{\alpha(a-b)\}}{\alpha(a-b)} \quad (20)$$

Accordingly, we have the following equation.

$$\int_{-\infty}^{\infty} \alpha \cdot sinc\{\alpha(x-a)\} \beta \cdot sinc\{\beta(x-b)\} dx = \pi\alpha \cdot sinc\{\alpha(a-b)\} \quad (21)$$

$$\therefore \int_{-\infty}^{\infty} sinc\{\alpha(x-a)\} \cdot sinc\{\beta(x-b)\} dx = \frac{\pi}{\beta} sinc\{\alpha(a-b)\} \quad (22)$$

In the above equation (22), when letting $$\alpha = \beta = \frac{\mu\eta T_0}{2}, x = t, a = 0, b = -\tau$$

we have the following equation.

$$\int_{-\infty}^{\infty} sinc\left(\frac{\mu\eta T_0}{2}t\right) \cdot sinc\left\{\frac{\mu\eta T_0}{2}(t+\tau)\right\} dt = \frac{2\pi}{\mu\eta T_0} sinc\left(\frac{\mu\eta T_0}{2}\tau\right) \quad (23)$$

If $\alpha > 0$, $$\int_{-\infty}^{\infty} sinc(ax) \cdot sinc\{a(x+b)\} dx = \frac{\pi}{a} sinc(ab) \quad (24)$$

If $\alpha < 0$, $$\int_{-\infty}^{\infty} sinc(ax) \cdot sinc\{a(x+b)\} dx = -\frac{\pi}{a} sinc(ab) \quad (25)$$

If $\alpha = 0$, $$\int_{-\infty}^{\infty} sinc(ax) \cdot sinc\{\alpha(x+b)\} dx = 0 \quad (26)$$

Hence, if $\alpha \neq 0$, the following holds.

$$\int_{-\infty}^{\infty} sinc(ax) \cdot sinc\{a(x+b)\} dx = \frac{\pi}{|a|} sinc(ab) \quad (27)$$

Since $\eta$, $T_0 > 0$ always holds, the above equation (23) can be represented as below, if $\mu \neq 0$.

$$\int_{-\infty}^{\infty} sinc\left(\frac{\mu\eta T_0}{2}t\right) \cdot sinc\left\{\frac{\mu\eta T_0}{2}(t+\tau)\right\} dt = \frac{2\pi}{|\mu|\eta T_0} sinc\left(\frac{\mu\eta T_0}{2}\tau\right) \quad (28)$$

Hence, if $\mu \neq 0$, the expression (18) can be given as the following expression (29).

$$R_{\mu\mu}(\tau) = \int_{-\infty}^{\infty} R_\mu^*(t) R_\mu(t+\tau) dt = $$

$$|A|^4 T_0^2 \exp(j\omega\eta\tau) \int_{-\infty}^{\infty} sinc\left(\frac{\mu\eta T_0 t}{2}\right) sinc\left\{\frac{\mu\eta T_0}{2}(t+\tau)\right\} dt = $$

$$|A|^4 T_0^2 \exp(j\omega\eta\tau) \frac{2\pi}{|\mu|\eta T_0} sinc\left(\frac{\mu\eta T_0}{2}\tau\right) \quad (29)$$

$R_{SS}(\tau)$ is given by following expression (where above expression (13) is cited again).

$$R_{SS}(\tau) = \begin{cases} \dfrac{2|A|^2}{\mu\eta\tau}\exp(j\omega\eta\tau)\sin\left\{\dfrac{\mu\eta\tau}{2}(T_0-\eta\tau)\right\} & 0 < \eta\tau \leq T_0 \\ |A|^2 T_0 & \eta\tau = 0 \\ \dfrac{2|A|^2}{\mu\eta\tau}\exp(j\omega\eta\tau)\sin\left\{\dfrac{\mu\eta\tau}{2}(T_0+\eta\tau)\right\} & -T_0 \leq \eta\tau < 0 \\ 0 & \eta\tau < -T_0 \text{ or } \eta\tau > T_0 \end{cases} \quad (13)$$

Hence, from $$R_{SS}(\tau) \approx |A|^2 T_0 \exp(j\omega\eta\tau) \text{sinc}\left(\frac{\mu\eta T_0 \tau}{2}\right) \quad (30)$$

we have the following equation.

$$R_{SS}(0) = |A|^2 T_0 \quad (31)$$

From the equation (29), we have $$R_{\mu\mu}(0) = \int_{-\infty}^{\infty} R_\mu^*(t) R_\mu(t) dt = |A|^4 T_0^2 \frac{2\pi}{|\mu|\eta T_0} \quad (32)$$

From the equations (31) and (32), we have $$R_{\mu\mu}(0) = \{R_{SS}(0)\}^2 \frac{2\pi}{|\mu|\eta T_0} \quad (33)$$

Accordingly, from the above equation (33), the Doppler coefficient η can be derived by following equation (34).

$$\eta = \frac{2\pi\{R_{ss}(0)\}^2}{|\mu| T_0 R_{\mu\mu}(0)} \quad (34)$$

In the equation (34), $R_{SS}(0)$ is a peak P of the cross-correlation value $R_{SS}(\tau)$, and thus the equation (34) can be represented as follows.

$$\eta = \frac{2\pi P^2}{|\mu| T_0 R_{\mu\mu}(0)} \quad (35)$$

where $R_{\mu\mu}(0)$ is a time-integrated value of a square of an absolute value of a cross-correlation result $R_{SS}(\tau)$. If the integrated value $R_{\mu\mu}(0)$ is obtained, it is not necessary to calculate an autocorrelation function form $R_{\mu\mu}(\tau)$. The autocorrelation function form $R_{\mu\mu}(\tau)$ has been derived in order to obtain an autocorrelation of an autocorrelation described later.

In the right side expression of the equation (35), since a frequency change rate μ is a value set in advance, it is possible to obtain a Doppler coefficient η. Hence, using the above expression (1a), a relative velocity v can be obtained by the following expression (36).

$$v = \frac{c(\eta - 1)}{2} = \frac{c}{2}\left(\frac{2\pi P^2}{|\mu| T_0 R_{\mu\mu}(0)} - 1\right) \quad (36)$$

Figure 4:
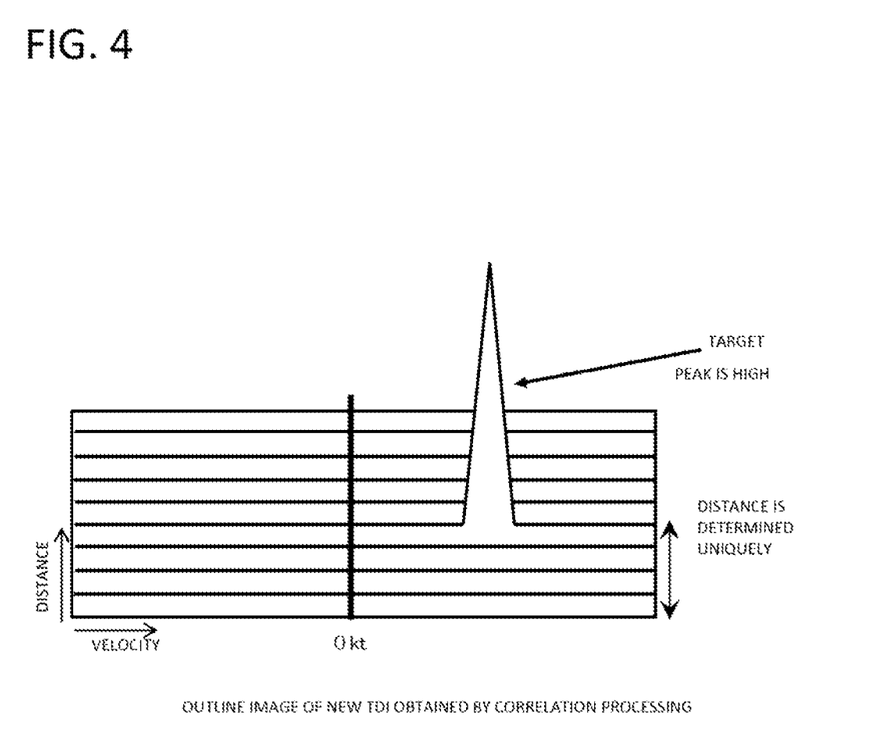
FIG. 4 is a diagram illustrating an example embodiment according to the present invention.

The display apparatus 106 receives the relative velocity v calculated using the above expression (36), from the correlation processor 105 and displays the relative velocity v, for example, as illustrated in FIG. 4. The display apparatus 106 may receive the peak value P of the correlation value, the integrated value S of the square of the correlation value, the frequency change rate μ, and the pulse length $T_0$ from the correlation processor 105, perform calculation of the expression (36) to obtain the relative velocity v, and displays the relative velocity v on the screen in association with a target distance.

By setting a range of integration of the square of a correlation value to, for example, a pulse interval (signal interval) or more of an LFM signal, a process gain which is a ratio of SNRs before and after the correlation can be the same or more than that obtainable when a replica correlation is performed. It is possible to raise visibility compared with a display based on PCW (Pulse Continuous Wave) with no correlation processing.

For example, when substituting a pulse length T=1 s and an analysis width Δf=1 s in the following expression (37), a process gain for PCW is PG=0 dB $$PG = 5\log\left(\frac{T}{\Delta f}\right) [\text{dB}] \quad (37)$$

In contrast, a process gain for the replica correlation of LFM becomes significantly large to be PG=23 dB, where a band range width B=100 Hz and a pulse length T=1 s are substituted in the following expression.

$$PG = 10 \log(2BT) [\text{dB}] \quad (38)$$

The expressions (37) and (38) are cited from expressions (11.84) and (11.65) in NPL 1.

According to the present example embodiment, although a plurality of pulses are used, it is made possible to estimate a target velocity without being affected by variation of pulse intervals of a propagation path of an acoustic wave.

As illustrated in FIG. 4, it is possible to grasp a position of a target with a high accuracy because a target position is indicated by a peak of correlation. Furthermore, because a transmission waveform of FH (Frequency Hopping) or the like can be used, a distance resolution can be raised higher than that in case of using a transmission waveform of HFM, visibility of a target can be increased.

The following considers calculating an autocorrelation of an autocorrelation result $R_{\mu\mu}(\tau)$ of the expression (29).

The autocorrelation result is given below.

$$R_{\mu\mu}(t) = |A|^4 T_0^2 \exp(j\omega\eta t) \frac{2\pi}{|\mu|\eta T_0} \text{sinc}\left(\frac{\mu\eta T_0}{2}t\right) = \quad (39)$$

$$|A|^4 T_0 \frac{2\pi}{|\mu|\eta} \exp(j\omega\eta t) \text{sinc}\left(\frac{\mu\eta T_0}{2}t\right)$$

The autocorrelation of the autocorrelation result is given below.

$$R_{aa}(\tau) = \quad (40)$$

$$\int_{-\infty}^{\infty} R_{\mu\mu}^*(t) R_{\mu\mu}(t+\tau) dt = |A|^8 T_0^2 \frac{4\pi^2}{|\mu|^2 \eta^2} \int_{-\infty}^{\infty} \exp(-j\omega\eta t) \text{sinc}\left(\frac{\mu\eta T_0 t}{2}\right)$$

$$\exp(j\omega\eta t + j\omega\eta\tau) \text{sinc}\left(\frac{\mu\eta T_0 t}{2} + \frac{\mu\eta T_0 \tau}{2}\right) dt =$$

$$|A|^8 T_0^2 \frac{4\pi^2}{|\mu|^2 \eta^2} \exp(j\omega\eta\tau) \int_{-\infty}^{\infty} \text{sinc}\left(\frac{\mu\eta T_0 t}{2}\right) \text{sinc}\left(\frac{\mu\eta T_0 t}{2} + \frac{\mu\eta T_0 \tau}{2}\right) dt$$

If μ≠0, the following equation holds.

$$\int_{-\infty}^{\infty} \text{sinc}\left(\frac{\mu\eta T_0}{2}t\right) \cdot \text{sinc}\left\{\frac{\mu\eta T_0}{2}(t+\tau)\right\} dt = \frac{2\pi}{|\mu|\eta T_0} \text{sinc}\left(\frac{\mu\eta T_0}{2}\tau\right) \quad (41)$$

Therefore, the expression (40) is given as below.

$$R_{aa}(\tau) = |A|^8 T_0^2 \frac{4\pi^2}{|\mu|^2 \eta^2} \exp(j\omega\eta\tau) \frac{2\pi}{|\mu|\eta T_0} sinc\left(\frac{\mu\eta T_0}{2}\tau\right) = \quad (42)$$

$$|A|^8 T_0 \frac{8\pi^3}{|\mu|^3 \eta^3} \exp(j\omega\eta\tau) sinc\left(\frac{\mu\eta T_0}{2}\tau\right)$$

From the above expression (39), we have $$R_{\mu\mu}(0) = |A|^4 T_0 \frac{2\pi}{|\mu|\eta} \quad (43)$$

Furthermore, from the above expression (42), we have the following equation.

$$R_{aa}(0) = \int_{-\infty}^{\infty} R_{\mu\mu}^*(t) R_{\mu\mu}(t) dt = |A|^8 T_0 \frac{8\pi^3}{|\mu|^3 \eta^3} \quad (44)$$

Thus, the following equation holds.

$$\frac{R_{aa}(0)}{\{R_{\mu\mu}(0)\}^2} = \frac{|A|^8 T_0 \frac{8\pi^3}{|\mu|^3 \eta^3}}{|A|^8 T_0^2 \frac{4\pi^2}{|\mu|^2 \eta^2}} = \frac{2\pi}{T_0 |\mu|\eta} \quad (45)$$

From the equation (45), the Doppler coefficient η is derived by the following equation (46).

$$\eta = \frac{2\pi \{R_{\mu\mu}(0)\}^2}{T_0 |\mu| R_{aa}(0)} \quad (46)$$

In this manner, it is also possible to obtain the Doppler coefficient η from the peak value $R_{\mu\mu}(0)$ of the autocorrelation $R_{\mu\mu}(\tau)$ of the cross-correlation value $R_{SS}(\tau)$ and the peak value $R_{aa}(0)$ of the autocorrelation of the autocorrelation $R_{\mu\mu}(0)$. The relative velocity v can be derived based on the above equation (36) from the obtained Doppler coefficient η.

Here, among cross-correlation in the expression (15) which reads:

$$R_{SS}(\tau) \approx |A|^2 T_0 \exp(j\omega\eta\tau) sinc\left(\frac{\mu\eta T_0 \tau}{2}\right) \quad (47)$$

In the autocorrelation of the cross-correlation in the above expression (29) which reads:

$$R_{\mu\mu}(\tau) = |A|^4 \tau_0^2 \exp(j\omega\eta\tau) \frac{2\pi}{|\mu|\eta T_0} sinc\left(\frac{\mu\eta T_0}{2}\tau\right) \quad (48)$$

and the autocorrelation of the autocorrelation in the above expression (42) which reads:

$$R_{aa}(\tau) = |A|^8 T_0 \frac{8\pi^3}{|\mu|^3 \eta^3} \exp(j\omega\eta\tau) sinc\left(\frac{\mu\eta T_0}{2}\tau\right) \quad (49)$$

$$\exp(j\omega\eta\tau) sinc\left(\frac{\mu\eta T_0}{2}\tau\right) \quad (50)$$

is a common term, wherein it can be regarded that a signal ($\exp(j\omega\eta\tau)$) whose angular frequency ϕη is modulated by $$sinc\left(\frac{\mu\eta T_0}{2}\tau\right) \quad (51)$$

That is, a frequency analysis is performed for correlation values of the expressions (47) to (49) (at least one thereof). For example, regarding a waveform which is modulated by, $$sinc\left(\frac{\mu\eta T_0}{2}\tau\right)$$

it is possible to obtain the Doppler coefficient η, by obtaining an average frequency of the modulation.

A time domain waveform $sin c(Wx)$ (where $W=\mu\eta T_0/2$), when Fourier transformed, becomes a rectangular wave in a frequency domain.

$$\int_{-\infty}^{\infty} \frac{\sin(Wt)}{t} e^{-i\omega t} dt = \begin{cases} \pi & \text{if } |\omega| \leq W \\ 0 & \text{if } |\omega| > W \end{cases} \quad (52)$$

Fourier transform of $\exp(j\omega\eta\tau)$ becomes δ function in a frequency domain, and a rectangular wave is obtained as a result of a convolution operation of the δ function and the rectangular wave of the expression (52) in the frequency domain. From information of a width W of the rectangular wave, the Doppler coefficient η may be obtained.

An example of PCW will be described below, where it is assumed that a transmission waveform (replica) is given by following expression.

$$s(t) = \begin{cases} B\exp(j\omega t) & |t| \leq \frac{T_0}{2} \\ 0 & \text{Other than above} \end{cases} \quad (53)$$

A received waveform is given below, with $t_0=0$ for the sake of simplicity, $$S(t) = \begin{cases} A\sqrt{\eta} \exp\{j\omega \cdot \eta t\} & |\eta t| \leq \frac{T_0}{2} \\ 0 & \text{other than above} \end{cases} \quad (54)$$

A transmission waveform is transmitted twice and autocorrelation of two received signals reflected by a target is calculated.

For τ=0, the autocorrelation is given as below.

$$R_{SS}(0) = \int_{-\infty}^{\infty} S^*(t) S(t) dt = \quad (55)$$

-continued $$|A|^2\eta \int_{-T_0/2\eta}^{T_0/2\eta} \exp\{-j\omega\eta t\}\exp(j\omega\eta t)dt = |A|^2\eta \int_{-T_0/2\eta}^{T_0/2\eta} = |A|^2 T_0$$

For $0<\eta\tau\leq T_0$, the autocorrelation is given as below.

$$R_{SS}(\tau) = \tag{56}$$

$$\int_{-\infty}^{\infty} S^*(t)S(t+\tau)dt = |A|^2\eta \int_{-T_0/2\eta}^{T_0/2\eta-\tau} \exp\{-j\omega\cdot\eta t\}\exp(j\omega\eta t + j\omega\eta\tau)dt =$$

$$|A|^2\eta \int_{-T_0/2\eta}^{T_0/2\eta-\tau} \exp(j\omega\eta\tau)dt = |A|^2\eta\exp(j\omega\eta\tau)\int_{-T_0/2\eta}^{T_0/2\eta-\tau} dt =$$

$$|A|^2\eta\exp(j\omega\eta\tau)\left(\frac{T_0}{\eta} - \tau\right) = |A|^2\exp(j\omega\eta\tau)(T_0 - \eta\tau)$$

On the other hand, for $-T_0\leq\eta\tau<0$, the autocorrelation is given as below.

$$R_{SS}(\tau) = \tag{57}$$

$$\int_{-\infty}^{\infty} S^*(t)S(t+\tau)dt = |A|^2\eta \int_{-T_0/2\eta-\tau}^{T_0/2\eta} \exp\{-j\omega\cdot\eta t\}\exp(j\omega\eta t + j\omega\eta\tau)dt =$$

$$|A|^2\eta \int_{-T_0/2\eta-\tau}^{T_0/2\eta} \exp(j\omega\eta\tau)dt = |A|^2\eta\exp(j\omega\eta\tau)\int_{-T_0/2\eta-\tau}^{T_0/2\eta} dt =$$

$$|A|^2\eta\exp(j\omega\eta\tau)\left(\frac{T_0}{\eta} - \tau\right) = |A|^2\exp(j\omega\eta\tau)(T_0 - \eta\tau)$$

The above is summarized below.

For $-T_0\leq\eta t\leq T_0$, the autocorrelation is given as below.

$$R_\mu(t) = R_{SS}(t) = |A|^2 \exp(j\omega\eta t)(T_0 - \eta|t|) \tag{58}$$

An autocorrelation of the autocorrelation given in the equation (58) is derived for $\tau=0$.

$$R_{\mu\mu}(0) = \tag{59}$$

$$\int_{-\infty}^{\infty} R_\mu^*(t)R_\mu(t)dt = |A|^4 \int_{-\infty}^{\infty} (T_0 - \eta|t|)^2 dt = |A|^4 \int_{-T_0/\eta}^{T_0/\eta} (T_0 - \eta|t|)^2 dt =$$

$$2|A|^4 \int_0^{T_0/\eta} (T_0 - \eta t)^2 dt = 2|A|^4 \int_0^{T_0/\eta} (T_0^2 - 2T_0\eta t + \eta^2 t^2) dt =$$

$$2|A|^4 \left[T_0^2 t - T_0\eta t^2 + \frac{\eta^2 t^3}{3}\right]_0^{T_0/\eta} = 2|A|^4\left(\frac{T_0^3}{\eta} - \frac{T_0^3}{\eta} + \frac{T_0^3}{3\eta}\right) = \frac{2|A|^4 T_0^3}{3\eta}$$

Therefore, we have the following equation.

$$R_{\mu\mu}(0) = \frac{2\{R_{SS}(0)\}^2 T_0}{3\eta} \tag{60}$$

The Doppler coefficient $\eta$ is given as below from the equation (60).

$$\eta = \frac{2\{R_{SS}(0)\}^2 T_0}{3R_{\mu\mu}(0)} \tag{61}$$

If a pulse which has a low distance resolution and may cause a mistake between a noise peak and a correlation peak under a low SNR environment be assumed to be a PCW, the Doppler coefficient $\eta$ is given as following Equation.

$$\eta = \frac{2P^2 T_0}{3S} \tag{62}$$

In the present example embodiment, instead of LFM, it is possible to use other waveforms such as FH (Frequency Hopping) and so on, with distance resolution higher than that of LFM. However, in this case, it is not possible to represent a target relative velocity using simple expressions as in the case of LFM or PCW as described above. Therefore, a relationship(s) among a peak value of correlation, an integrated value and a relative velocity may be obtained in advance, and then, a relative velocity may be estimated from the integrated value and the peak value of correlation using the relationship(s).

In the present example embodiment, it is possible to increase estimation accuracy of a velocity in such manner that, when three or more transmission waveforms are used, for example, a plurality of pairs each having two waveforms are extracted, a correlation value between each pair is calculated, a target velocity is estimated based on a peak value of the correlation value and an integrated value of the correlation value for each pair, and the estimated velocities are averaged among the pairs.

As for a received signal with a high SNR, the target velocity may be obtained from a relationship between a peak of the autocorrelation and an integrated value of the square of an absolute value of an autocorrelation obtained by autocorrelating a single pulse, without transmitting a plurality of pulses.

In the above example embodiments, although described in view of a monostatic sonar that a transmitter and a receiver are arranged in the same place (transmission and reception are performed by a common acoustic array), it is possible to apply to a bistatic sonar (assembly) in which a transmitter and a receiver are arranged at a distance between them and a multi-static sonar (assembly) in which a plurality of receivers receive a signal(s) from one transmitter.

Figure 5:
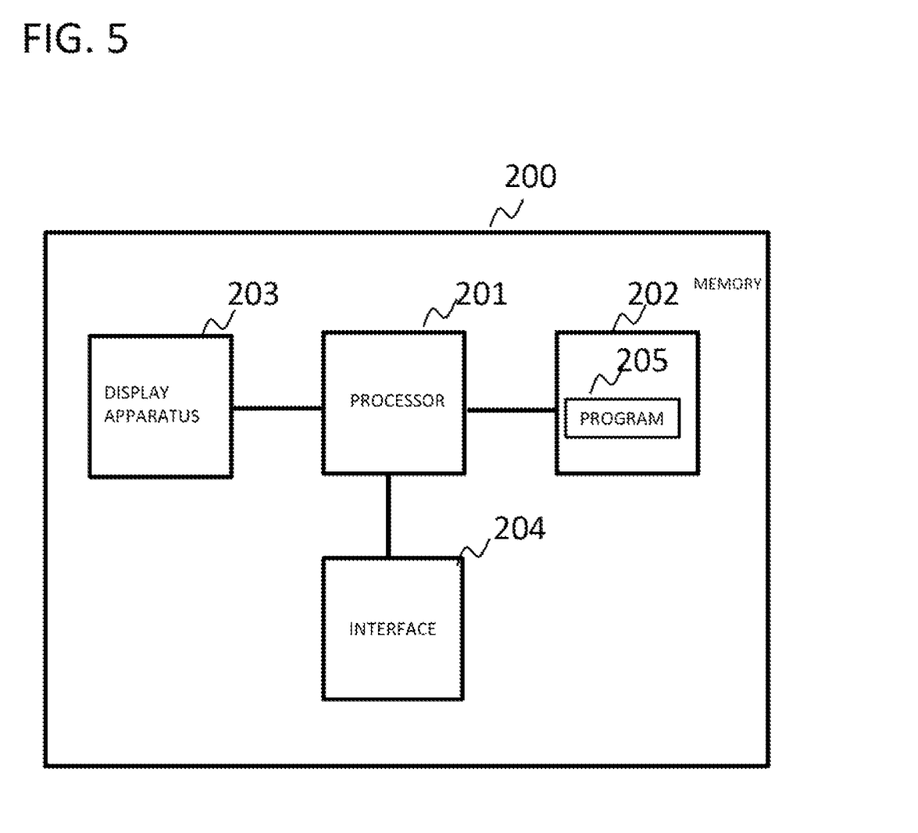
FIG. 5 is a diagram illustrating an example embodiment according to the present invention.

FIG. 5 illustrates a configuration of an example embodiment according to the present invention, in which a sonar apparatus is implemented on a computer apparatus 200. Referring to FIG. 5, the computer apparatus 200 includes a processor 201, a memory 202 which may be a semiconductor memory, such as RAM (Random Access Memory), ROM (Read Only Memory), EEPROM (Electrically Erasable Programmable Read-Only Memory) and so on (otherwise, it may be HDD (Hard Disk Drive) or SSD (Solid State Drive) and so on), a display apparatus 203, and an interface 204 (bus interface) which connects to an acoustic array 101 and AD converter 103 as shown in FIG. 2 and so on. The processor 201 may be a DSP (Digital Signal Processor). The processor 201 performs processing of the transmission controller 102, the phase adjuster 104 and the correlation processor 105 by executing a program 205 stored in the memory 202.

According to the present example embodiment, even in a low SNR situation, if there are two echoes from a target, it is possible to estimate a relative velocity in a line-of-sight direction of the target. Furthermore, in a high SNR situation, even if there is one echo from a target, it is possible to estimate a relative velocity in a line-of-sight direction of the target and no transmission waveform (replica signal) is necessary.

Although the above example embodiments are described by taking a sonar system for example, application of the present invention is not limited to a sonar system and application to a radar system, a laser system or the like can be conceivable and possible.

Each disclosure of the above PTL 1 and NPL 1 is incorporated herein by reference thereto. Variations and adjustments of the example embodiments and examples are possible within the scope of the overall disclosure (including the claims) of the present invention and based on the basic technical concept of the present invention. Furthermore, various combinations and selections of various disclosed elements (including the elements in each of the claims, example embodiments, examples, drawings, etc.) are possible within the scope of the claims. Namely, the present invention of course includes various variations and modifications that could be made by those skilled in the art according to the overall disclosure including the claims and the technical concept.

The example embodiments described above can be described as the following supplementary notes (abbreviated as note).

(Note 1)
An apparatus (reception apparatus), comprising:
a processor connected to a reception array and a display apparatus, by performing time-integration of a square of the correlation value
wherein the processor
extracts a signal in a predetermined time range from a signal received by the reception array,
calculates a correlation value of a signal waveform extracted,
detects a peak value of the correlation value,
calculates an integrated value by performing time-integration of the square of the correlation value,
derives a target velocity, based on the peak value and the integrated value, and
displays the target velocity on a display apparatus.

(Note 2)
The sonar apparatus (reception apparatus) according to note 1, wherein the signal received by the acoustic array is a pulse signal modulated by Linear Frequency Modulation (LFM), and
wherein the processor
calculates a cross-correlation value between two signal waveforms extracted, and
calculates a Doppler coefficient, based on the integrated value and the peak value of the cross-correlation value, and an absolute value of a frequency change rate and a pulse length to derive the target velocity.

(Note 3)
The apparatus (reception apparatus) according to note 1, wherein the signal received by the acoustic array is a pulse signal modulated by Linear Frequency Modulation (LFM), and
wherein the processor
calculates a Doppler coefficient based on a peak value $R_{\mu\mu}(0)$ of an autocorrelation $R_{\mu\mu}(\tau)$ of the correlation value, a peak value $R_{aa}(0)$ of an autocorrelation $R_{aa}(\tau)$ of the autocorrelation $R_{\mu\mu}(\tau)$, and an absolute value of a frequency change rate and a pulse length to derive the target velocity.

(Note 4)
The apparatus (reception apparatus) according to note 1, wherein the processor calculates a Doppler coefficient, based on a peak value $R_{\mu\mu}(0)$ of an autocorrelation $R_{\mu\mu}(\tau)$ of a cross-correlation value between two signal waveforms extracted, a peak value $R_{aa}(0)$ of an autocorrelation $R_{aa}(\tau)$ of the autocorrelation $R_{\mu\mu}(\tau)$, and an absolute value of a frequency change rate and a pulse length to derive the target velocity.

(Note 5)
The apparatus (reception apparatus) according to note 1, wherein the signal received by the acoustic array is a Pulse Continuous Wave (PCW) signal, and
wherein the processor,
calculates a Doppler coefficient based on a peak value of the correlation value, the integrated value of an autocorrelation of the correlation value, and a pulse length, and obtains the target velocity.

(Note 6)
The apparatus (reception apparatus) according to note 1, wherein relationship among at least, the peak value, the integrated value, and a relative velocity between the sonar apparatus and the target are stored in advance in a storage part, and
wherein the processor,
obtains the target velocity based on at least the peak value and the integrated value obtained for the signal received by the acoustic array, with reference to the storage apparatus.

(Note 7)
The apparatus (reception apparatus) according to note 1, wherein the signal received by the reception array is a single pulse, and
wherein the processor,
calculates an autocorrelation value of the single pulse,
calculates the integrated value by performing time-integration of a square of the autocorrelation value, and
derives the target velocity, based on a peak value of the autocorrelation value of the single pulse and an integrated value of the square of the autocorrelation value.

(Note 8)
The apparatus (reception apparatus) according to note 1, wherein the processor
extracts a set of two pairs with respect to three or more extracted signal waveforms;
calculates a correlation value between each of the pairs and obtains the target velocity based on the peak value and an integrated value of the square of the correlation value for each of the pairs; and performs averaging of the target velocities among the pairs (Note 9)
The apparatus (reception apparatus) according to any one of notes 1 to 3, wherein the processor controls to output a transmission signal at a predetermined transmission interval, and calculates the correlation value between two signal waveforms extracted, a time interval therebetween corresponding to the transmission interval for a plurality of extracted signals.

(Note 10)
The apparatus (reception apparatus) according to note 2 or 3, wherein the predetermined time range is longer than a pulse length of the received signal.

What is claimed is:
1. A sonar apparatus comprising:
a processor in circuit communication to an acoustic array and a display apparatus; and
a memory storing program instructions executable by the processor, wherein the processor, when executing the program instructions stored in the memory:
extracts one or more signal waveforms in a predetermined time range from a signal received by the acoustic array;
calculates a correlation value of the one or more signal waveforms that has been extracted;
detects a peak value of the correlation value;
calculates an integrated value by performing time-integration of a square of the correlation value;
derives a target velocity, based on the peak value and the integrated value; and
displays the target velocity on a display apparatus.

2. The sonar apparatus according to claim 1, wherein the one or more signal waveforms comprise two signal waveforms, the signal received by the acoustic array is a pulse signal modulated by Linear Frequency Modulation (LFM), and
wherein the processor, when executing the program instructions stored in the memory:
calculates a cross-correlation value between the two signal waveforms extracted, as the correlation value; and
calculates a Doppler coefficient, based on the integrated value and the peak value of the cross-correlation value, and an absolute value of a frequency change rate and a pulse length to derive the target velocity.

3. The sonar apparatus according to claim 1, wherein the one or more signal waveforms comprise two signal waveforms, the correlation value is a cross-correlation value between the two signal waveforms, the signal received by the acoustic array is a pulse signal modulated by Linear Frequency Modulation (LFM), and
wherein the processor, when executing the program instructions stored in the memory:
calculates a Doppler coefficient, based on a peak value $R_{\mu\mu}(0)$ of an autocorrelation $R_{\mu\mu}(\tau)$ of the cross-correlation value, a peak value $R_{aa}(0)$ of an autocorrelation $R_{aa}(\tau)$ of the autocorrelation $R_{\mu\mu}(\tau)$, and an absolute value of a frequency change rate and a pulse length to derive the target velocity.

4. The sonar apparatus according to claim 1, wherein the processor, when executing the program instructions stored in the memory:
calculates a cross-correlation value $R_{SS}(\tau)$, an autocorrelation $R_{\mu\mu}(\tau)$ of the cross-correlation value, and an autocorrelation $R_{aa}(\tau)$ of the autocorrelation $R_{\mu\mu}(\tau)$ of the cross-correlation value, and
performs frequency analysis of at least one of the cross-correlation value $R_{SS}(\tau)$, the autocorrelation $R_{\mu\mu}(\tau)$ of the cross-correlation value, and the autocorrelation $R_{aa}(\tau)$ of the autocorrelation $R_{\mu\mu}(\tau)$ of the cross-correlation value to derive the target velocity.

5. The sonar apparatus according to claim 1, wherein the signal received by the acoustic array is a Pulse Continuous Wave (PCW) signal, and
wherein the processor, when executing the program instructions stored in the memory:
calculates a Doppler coefficient based on the peak value of the correlation value, the integrated value of an autocorrelation of the correlation value, and a pulse length, to derive the target velocity.

6. The sonar apparatus according to claim 1, wherein a relationship among at least the peak value, the integrated value, and a relative velocity between the sonar apparatus and a target having the target velocity are stored in advance in a storage apparatus, and
wherein the processor, when executing the program instructions stored in the memory:

derives the target velocity, based on at least the peak value and the integrated value obtained for the signal received by the acoustic array, with reference to the storage apparatus.

7. The sonar apparatus according to claim 1, wherein the signal received by the acoustic array is a single pulse, and
wherein the processor, when executing the program instructions stored in the memory:
calculates an autocorrelation value of the single pulse, as the correlation value;
calculates the integrated value by performing time-integration of a square of the autocorrelation value; and
derives the target velocity, based on the peak value of the autocorrelation value of the single pulse and an integrated value of the square of the autocorrelation value.

8. The sonar apparatus according to claim 1, wherein the one or more signal waveforms comprise three or more signal waveforms, and
wherein the processor, when executing the program instructions stored in the memory:
selects one or more pairs from among the three or more signal waveforms extracted;
calculates a cross-correlation value between each of the one or more pairs;
obtains one or more target velocities, for the one or more pairs, each of the one or more target velocities being derived based on the peak value and an integrated value of the square of the cross-correlation value between each of the one or more pairs to calculate, as the target velocity, an average value of the one or more target velocities; and
displays the average value of the target velocity for each of the one or more pairs on the display.

9. The sonar apparatus according to claim 1, wherein the processor, when executing the program instructions stored in the memory:
outputs a transmission signal at a predetermined transmission interval; and
calculates the correlation value between two signal waveforms extracted, a time interval therebetween corresponding to the transmission interval for a plurality of the signals extracted.

10. The sonar apparatus according to claim 1, wherein the predetermined time range is longer than a pulse length of the received signal.

11. A computer-implemented target velocity display method, comprising:
extracting, by a processor, one or more signal waveforms in a predetermined time range from a signal received by the acoustic array;
calculating, by the processor, a correlation value of the one or more signal waveforms that has been extracted;
detecting, by the processor, a peak value of the correlation value;
calculating, by the processor, an integrated value by performing time-integration of a square of the correlation value; and
deriving, by the processor, a target velocity based on the peak value and the integrated value, to display the target velocity on a display apparatus.

12. The computer-implemented target velocity display method according to claim 11, wherein the one or more signal waveforms comprise two signal waveforms, the sig nal received by the acoustic array is a pulse signal modulated by Linear Frequency Modulation (LFM), and wherein the method further comprises:

calculating, by the processor, a cross-correlation value between the two signal waveforms extracted, as the correlation value; and calculating, by the processor, a Doppler coefficient, based on the integrated value and the peak value of the cross-correlation value, and an absolute value of a frequency change rate and a pulse length to derive the target velocity.

13. The computer-implemented target velocity display method according to claim 11, wherein the one or more signal waveforms comprise two signal waveforms, the correlation value is a cross-correlation value between the two signal waveforms, the signal received by the acoustic array is a pulse signal modulated by Linear Frequency Modulation (LFM), and wherein the method further comprises:

calculating, by the processor, a Doppler coefficient, based on a peak value $R_{\mu\mu}(0)$ of an autocorrelation $R_{\mu\mu}(\tau)$ of the cross-correlation value between two signal waveforms extracted, a peak value $R_{aa}(0)$ of an autocorrelation $R_{aa}(\tau)$ of the autocorrelation $R_{\mu\mu}(\tau)$, and an absolute value of a frequency change rate and a pulse length to derive the target velocity.

14. The computer-implemented target velocity display method according to claim 11, further comprising:

calculating, by the processor, a cross-correlation value $R_{SS}(\tau)$, an autocorrelation of the cross-correlation value, and an autocorrelation $R_{aa}(\tau)$ of the autocorrelation $R_{\mu\mu}(\tau)$ of the cross-correlation value; and performing, by the processor, frequency analysis of at least one of the cross-correlation value $R_{SS}(\tau)$, the autocorrelation $R_{\mu\mu}(\tau)$ of the cross-correlation value, and the autocorrelation $R_{aa}(\tau)$ of the autocorrelation $R_{\mu\mu}(\tau)$ of the cross-correlation value to derive the target velocity.

15. The computer-implemented target velocity display method according to claim 11, wherein the signal received by the acoustic array is a Pulse Continuous Wave (PCW) signal, and wherein the method further comprises:

calculating, by the processor, a Doppler coefficient based on the peak value of the correlation value, the integrated value of an autocorrelation of the correlation value, and a pulse length, to derive the target velocity.

16. The computer-implemented target velocity display method according to claim 11, further comprising:

storing, by the processor, a relationship among at least the peak value, the integrated value, and a relative velocity between the sonar apparatus and a target having the target velocity in advance in a storage apparatus; and deriving, by the processor, the target velocity, based on at least the peak value and the integrated value obtained for the signal received by the acoustic array, with reference to the storage apparatus.

17. The computer-implemented target velocity display method according to claim 11, wherein the signal received by the acoustic array is a single pulse, and wherein the method further comprises:

calculating, by the processor, an autocorrelation value of the single pulse, as the correlation value;

calculating, by the processor, the integrated value by performing time-integration of a square of the autocorrelation value; and deriving, by the processor, the target velocity, based on the peak value of the autocorrelation value of the single pulse and an integrated value of the square of the autocorrelation value.

18. A non-transitory computer-readable medium storing thereon a program that when executed by a processor causes the processor to execute processing comprising:

extracting one or more signal waveforms in a predetermined time range from a signal received by the acoustic array;

calculating a correlation value of the one or more signal waveforms that has been extracted;

detecting a peak value of the correlation value;

calculating an integrated value by performing time-integration of a square of the correlation value; and deriving a target velocity based on the peak value and the integrated value, to display the target velocity on a display apparatus.

19. The non-transitory computer-readable medium according to claim 18, wherein the one or more signal waveforms comprise two signal waveforms, the signal received by the acoustic array is a pulse signal modulated by Linear Frequency Modulation (LFM), and wherein the program when executed by the processor causes the processor to execute the processing further comprising:

calculating a cross-correlation value between the two signal waveforms extracted; and calculating a Doppler coefficient, based on the integrated value and the peak value of the cross-correlation value, and an absolute value of a frequency change rate and a pulse length to derive the target velocity.

20. The non-transitory computer-readable medium according to claim 18, wherein the one or more signal waveforms comprise two signal waveforms, the correlation value is a cross-correlation value between the two signal waveforms, the signal received by the acoustic array is a pulse signal modulated by Linear Frequency Modulation (LFM), and wherein the program when executed by the processor causes the processor to execute the processing further comprising:

calculating a Doppler coefficient, based on a peak value $R_{\mu\mu}(0)$ of an autocorrelation $R_{\mu\mu}(\tau)$ of the cross-correlation value, a peak value $R_{aa}(0)$ of an autocorrelation $R_{aa}(\tau)$ of the autocorrelation $R_{\mu\mu}(\tau)$, and an absolute value of a frequency change rate and a pulse length to derive the target velocity.

* * * * *